United States Patent
Song

(10) Patent No.: US 10,534,874 B2
(45) Date of Patent: Jan. 14, 2020

(54) PARTICLE ETCHING OR DEPOSITING EVOLUTIONARY SIMULATION METHOD AND DEVICE AND COMPUTER READABLE MEDIUM

(71) Applicant: Tsinghua University, Beijing (CN)

(72) Inventor: Yixu Song, Beijing (CN)

(73) Assignee: Tsinghua University, Beijing (CN)

( * ) Notice: Subject to any disclaimer, the term of this patent is extended or adjusted under 35 U.S.C. 154(b) by 354 days.

(21) Appl. No.: 15/525,209

(22) PCT Filed: Nov. 13, 2014

(86) PCT No.: PCT/CN2014/091040
§ 371 (c)(1),
(2) Date: May 8, 2017

(87) PCT Pub. No.: WO2016/074202
PCT Pub. Date: May 19, 2016

(65) Prior Publication Data
US 2017/0323034 A1    Nov. 9, 2017

(51) Int. Cl.
*G06F 17/50*    (2006.01)

(52) U.S. Cl.
CPC ...... *G06F 17/5009* (2013.01); *G06F 2217/16* (2013.01)

(58) Field of Classification Search
CPC .......................... G06F 17/5009; G06F 2217/16
(Continued)

(56) References Cited

U.S. PATENT DOCUMENTS

| | | | | |
|---|---|---|---|---|
| 2005/0071037 A1* | 3/2005 | Strang | ............. | G05B 19/41885 700/121 |
| 2015/0269282 A1* | 9/2015 | Nelaturi | ................. | G06F 17/50 700/98 |

(Continued)

FOREIGN PATENT DOCUMENTS

| | | |
|---|---|---|
| CN | 102521886 A | 6/2012 |
| CN | 103336858 A | 10/2013 |
| CN | 103440673 A | 12/2013 |

OTHER PUBLICATIONS (L. Chiaramonte et. al., "A numerical method for the efficient atomistic simulation of the plasma-etch of nano-patterned structures", Computational Materials Science 54 (2012) 227-235) (Year: 2012).*

(Continued)

*Primary Examiner* — Aniss Chad
*Assistant Examiner* — Justin C Mikowski
(74) *Attorney, Agent, or Firm* — IPro, PLLC

(57) ABSTRACT

The present invention provides particle etching or depositing evolutionary simulation method and device. The method comprises: step 1. obtaining an initial profile; step 2. sampling a series of areas for the profile, and performing an evolution process on each of the series of area by using a micro etching or depositing method; step 3. obtaining macro profile evolution parameters based on a micro evolutionary computation result; step 4. performing macro profile evolutionary computation, comprising: performing profile evolutionary computation by using a macro profile evolution method based on the macro evolution parameters; and step 5, judging whether a termination condition is met, if yes, terminating evolution, and if not, repeating the steps 2-4. In the evolutionary simulation method according to embodiments of the present invention, a micro evolution condition is determined by macro computation, meanwhile, the micro evolution result is transferred to a macro process to determine macro evolution parameters, so that macro computation and micro computation are organically coupled, a trans-scale simulation problem is at least partially solved, and the simulation result is more accurate and rapid.

17 Claims, 7 Drawing Sheets

(58) Field of Classification Search
USPC .................................................. 706/6; 703/6
See application file for complete search history.

(56) References Cited

U.S. PATENT DOCUMENTS

| | | | |
|---|---|---|---|
| 2015/0269289 A1* | 9/2015 | Kim .................... | G06F 17/5009 |
| | | | 703/6 |
| 2016/0004802 A1* | 1/2016 | Herrmann ........... | G06F 17/5009 |
| | | | 703/2 |
| 2016/0086376 A1* | 3/2016 | Tang ....................... | G06T 17/20 |
| | | | 345/420 |
| 2016/0321384 A1* | 11/2016 | Pal ...................... | G06F 17/5018 |

OTHER PUBLICATIONS (Antonio La Magna and Giuseppe Garozzo, "Factors Affecting Profile Evolution in Plasma Etching of SiO2" Journal of the Electrochemical Society, 150 (10) F178-F185 (2003)) (Year: 2003).*
Gao, Yangfu et al. An optimization method for ion etching yield modeling based on etching on etching velocity matching. Acta Phys. Sin., vol. 63, No. 4, May 20, 2014(May 20, 2014) ISSN:1000-3290,pp. 1 to 4 and figure 1.
Yang, Hongjun et al. A 3D profile evolution method of ion etching simulation based on compression representation. Acta Phys. Sin., vol. 62, No. 20, Oct. 20, 2013 (Oct. 20, 2013), ISSN:1000-3290, pp. 1-3.

* cited by examiner

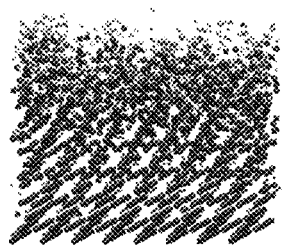 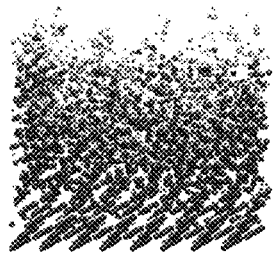 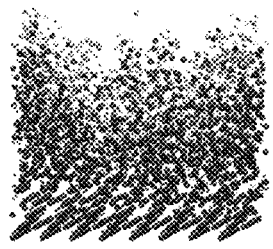
Fig. 6A  Fig. 6B  Fig. 6C
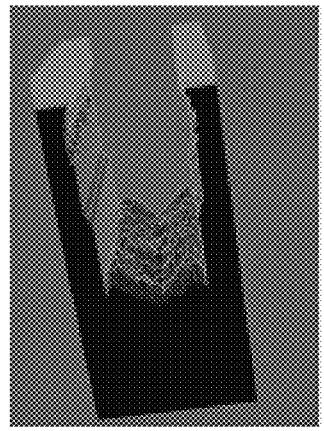
Fig. 7

PARTICLE ETCHING OR DEPOSITING EVOLUTIONARY SIMULATION METHOD AND DEVICE AND COMPUTER READABLE MEDIUM

FIELD OF THE INVENTION

The present invention generally relates to etching and depositing simulation technique in microelectronic processing technology, and more particularly, to a particle etching or depositing evolutionary simulation method and device and a computer readable medium.

BACKGROUND OF THE INVENTION

The etching and depositing process in the field of microelectronic processing means that micro particles (mainly including ions and neutral particles) in a cavity interact with a substrate to be processed to complete the processing process. This is a typical trans-scale process, in which nano-scale or micron-scale processing is completed through etching and depositing of micro particles on atom scale.

The processing cost of etching and depositing is very high, so computer simulation becomes effective means in order to deeply understand process engineering. However, due to the trans-scale characteristic of this process, a lot of difficulties are brought to the simulation process.

Currently, common simulation methods for etching and depositing a profile mainly include a cellular automaton, a string algorithm, a level set and the like, and in such methods, etching yield or etching (depositing) rate and other parameters of a certain particle for a substrate is input to accomplish surface evolution. However, in applications, these parameters are often difficult to obtain, meanwhile, as these parameters actually are dynamically changed due to continuous change of a processing environment in practical processing, it is inaccurate to use fixed parameters to perform simulation in a traditional simulation method. Meanwhile, in the aspect of presenting simulation results, a macro method can reflect the evolution process of a whole profile, can be used for researching microgroove etching, nonuniform depositing coverage and other phenomena, but cannot completely express a micro process, such as generation of an amorphous layer in the etching process.

When atom-scale simulation is performed on a micro scale, a molecular dynamics or monte-carlo method is often used. Such methods perform systematic evolution towards a certain trend (such as the minimum energy) through a given potential function (or probability of various behaviors on surfaces of the particles) and other evolution rules and through interaction of incident particles and atoms of the substrate. This method has the characteristics that the micro particle evolution process can be described, but the time and space scales obtained through computation are very small, and the requirement of large-scale computation cannot be met.

SUMMARY OF THE INVENTION

In view of the above, the present invention is provided.

According to an aspect of the present invention, provided is a particle etching or depositing evolutionary simulation method applied to a material surface and implemented by a computer, which is used for predicting the morphology of a material surface to be etched or deposited after etching or depositing is performed for given time. The particle etching or depositing evolutionary simulation method includes: step 1, obtaining an initial profile; step 2, sampling a series of areas for the profile, performing an evolution process on each of the series of areas by using a micro etching or depositing method to obtain a micro evolutionary computation result, wherein incident particles vs. substrate is modeled by using a micro etching or depositing method, so that the particles are subjected to automatic dynamics evolution through a potential function or a set rule to obtain the change of the substrate under the action of incident ions or neutral particles, the change being regarded as the depositing or etching result of these particles on the substrate; step 3, obtaining macro profile evolution parameters based on the micro evolutionary computation result; step 4, performing macro profile evolutionary computation, including: performing profile evolutionary computation based on the macro evolution parameters by using a macro profile evolution method until a predetermined pause condition or evolution termination condition is met, obtaining a new profile and storing the profile evolution result, wherein in the macro profile evolution method, the overall morphology etched and deposited under the action of a large number of particles is obtained through evolution by giving the etching yield, the depositing yield, the etching rate or depositing rate of some material under the action of a certain particle flow; and step 5, judging whether the termination condition is met, if yes, terminating evolution, and if not, repeating the steps 2-4.

According to an aspect of the present invention, provided is a computer readable medium, storing an instruction set thereon which, when being executed by a processor, guides the processor to perform the above etching or depositing evolutionary simulation method.

According to another aspect of the present invention, provided is a particle etching or depositing evolutionary simulation device applied to a material surface, which is used for predicting the morphology of a material surface to be etched or deposited after etching or depositing simulation is performed, the particle etching or depositing evolutionary simulation method including:

an initial profile obtaining component, configured to obtain an initial profile; a profile sampling and micro evolution component, configured to sample a series of areas for the profile, and perform an evolution process on each of the series of areas by using a micro etching or depositing method to obtain a micro evolutionary computation result, wherein incident particles vs. substrate is modeled by using a micro etching or depositing method, so that the particles are subjected to automatic dynamics evolution through a potential function or a set rule to obtain the change of the substrate under the action of incident ions or neutral particles, these changes being regarded as the depositing or etching result of these particles on the substrate; a macro profile evolution parameter obtaining component, configured to obtain macro profile evolution parameters based on the micro evolutionary computation result; a macro profile evolution component, configured to perform macro profile evolutionary computation, including: performing profile evolutionary computation based on the macro evolution parameters by using a macro profile evolution method until a predetermined pause condition or evolution termination condition is met, obtaining a new profile and storing the profile evolution result, wherein in the macro profile evolution method, the overall morphology etched and deposited under the action of a large number of particles is obtained through evolution by giving the etching yield, the depositing yield, the etching rate or depositing rate of some material under the action of a certain particle flow; and an iteration control component, configured to judge whether the termination condition is met, if yes, terminate evolution, and if not, enable the profile sampling and micro evolution component, the macro profile evolution parameter obtaining component and the macro profile evolution component to repeat the operations.

In the case of the particle etching or depositing evolutionary simulation method and device according to the embodiment of the present invention, micro evolutionary computation is performed by sampling a macro area in the etching and depositing simulation process, and parameters necessary for macro simulation computation are obtained in a dynamic environment, so that key parameters of the macro evolution method obtained are more well-founded and more accurate.

With the particle etching or depositing evolutionary simulation method and device according to the embodiment of the present invention, macro computation determines micro evolution condition, meanwhile, a micro evolution result is transferred to a macro process to determine macro evolution parameters (including change of space particle distribution), so as to realize organic coupling of macro computation and micro computation.

The particle etching or depositing evolutionary simulation method and device according to the embodiment of the present invention combine the macro method and the micro method which are used for etching and depositing computation, thus at least partially solving the problem of trans-scale simulation. Therefore, the simulation result is more accurate and rapid, which is favorable for more comprehensively understanding the mechanism of the process and adjusting process parameters by a user.

BRIEF DESCRIPTION OF THE DRAWINGS

These and/or other aspects and advantages of the present invention will become clearer and easier to understand from the detailed description of the embodiments of the present invention in combination with the accompanying drawings, in which:

FIGS. 6A, 6B and 6C schematically shows a micro molecular dynamics computation example of three sampling points on one profile.

FIG. 7 schematically shows the overall morphology of a material after a period of macro profile evolution.

FIG. 8 shows a flow chart of a particle etching evolutionary simulation method according to an embodiment of the present invention.

DETAILED DESCRIPTION OF THE EMBODIMENTS

Figure 1:
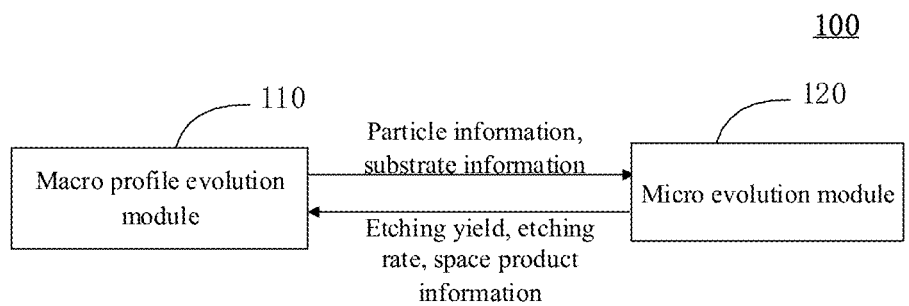
FIG. 1 schematically illustrates close combination of a macro evolution module 110 and a micro evolution module 120 according to an embodiment of the present invention.

In order to make a person skilled in the art better understand the present invention, the present invention will be further illustrated in detail below in conjunction with the accompanying drawings and specific embodiments.

Before detailed description, meanings of terms used herein will be illustrated first.

A "macro profile evolution method" means that the overall morphology etched and deposited under the action of a large number of particles is obtained through evolution by giving the etching yield, the depositing yield, the etching rate or depositing rate of some material under the action of a certain particle flow. As an example, the macro profile evolution method includes a cellular automaton, a string algorithm, a level set or other hatching line evolution method. Correspondingly, a profile formed by using the macro profile evolution method is called a "macro profile", and parameters used in the macro profile evolution method are called "macro parameters".

A "micro evolution method" means that incident particles vs. substrate is modeled, so that particles are subjected to automatic dynamics evolution through a potential function or a set rule to obtain the change of the substrate under the action of incident ions or neutral particles, these changes being regarded as the depositing or etching result of these particles on the substrate. As an example, the micro evolution method includes a molecular dynamics or monte-carlo method or other particle evolution method.

In description below, the cellular automaton method is taken as an example of the macro evolution method, while the molecular dynamics method is taken as an example of the micro evolution method. However, it should be clear to a person skilled in the art that these are merely examples for facilitating illustration, and the present invention is not limited to these examples.

A cellular automaton profile etching evolution method means that a simulation area is divided into a plurality of cells including different materials, then incident particles are generated from the upper surface of a material by using, for example, the monte-carlo method according to the distribution of boundary particles (e.g., ions) and distribution of incident angles, and subsequently, particle movement is tracked until the particles reach the surface of the material or leave the simulation area. If the particles reaching the surface of the material meet the etching condition, the number of atoms for etching is calculated according to an etching yield model, the atoms are subtracted from the cell where they are located to realize etching; otherwise, the particles continue to be tracked for the second time. When the number of atoms in the cell is zero, the cell becomes an empty cell, so that etching surface is advanced forward. It thus can be seen the cell based profile etching evolution method relies on an etching yield model.

The molecular dynamics micro evolution method is a method in which stress on particles is solved through a given potential function and the particles generate movement to cause the overall system are subjected to evolution towards a minimum energy target.

The present invention is preferably performed by a computing device, which may be a general computer, for example, a work station, a desktop computer, a notebook computer or the like, or may be a specifically designed computing device with a storage device, a central processing unit (CPU), a memory and the like. The etching or depositing simulation method of the embodiments of the present invention may be implemented as a computer executable instruction set, which can be stored on a storage device, for example, and when the instruction set is executed, the central processing unit (CPU) loads it into a memory and executes the same, so as to execute the etching or depositing simulation function. From the perspective of implementation with computer programs, the embodiments of the present invention are embodied in close combination of a macro evolution module and a micro evolution module.

FIG. 1 schematically illustrates close combination of a macro evolution module 110 and a micro evolution module 120 according to an embodiment of the present invention. The macro evolution module 110 transfers information of input particles (for example, type of particles, particle energy, an incident angle, number of particles, flux and the like) of an area sampled for micro computation and information of a substrate such as a material model to the micro evolution module 120, the micro evolution module 120 dynamically calculates the etching yield of the area, the etching (depositing) rate and other calculation parameters needed by the macro profile evolution method, and meanwhile, the micro evolution module 120 transfers information of a space product departing from the substrate to the macro evolution module. In the macro and micro coupled calculation manner, a macro evolution process can be adaptively dynamically change desired parameters and can obtain both macro-scale and micro-scale computation results at the same time, so that a user can simultaneously know the whole etching and depositing process in two aspects of the profile shape and the micro evolution mechanism.

Figure 2:
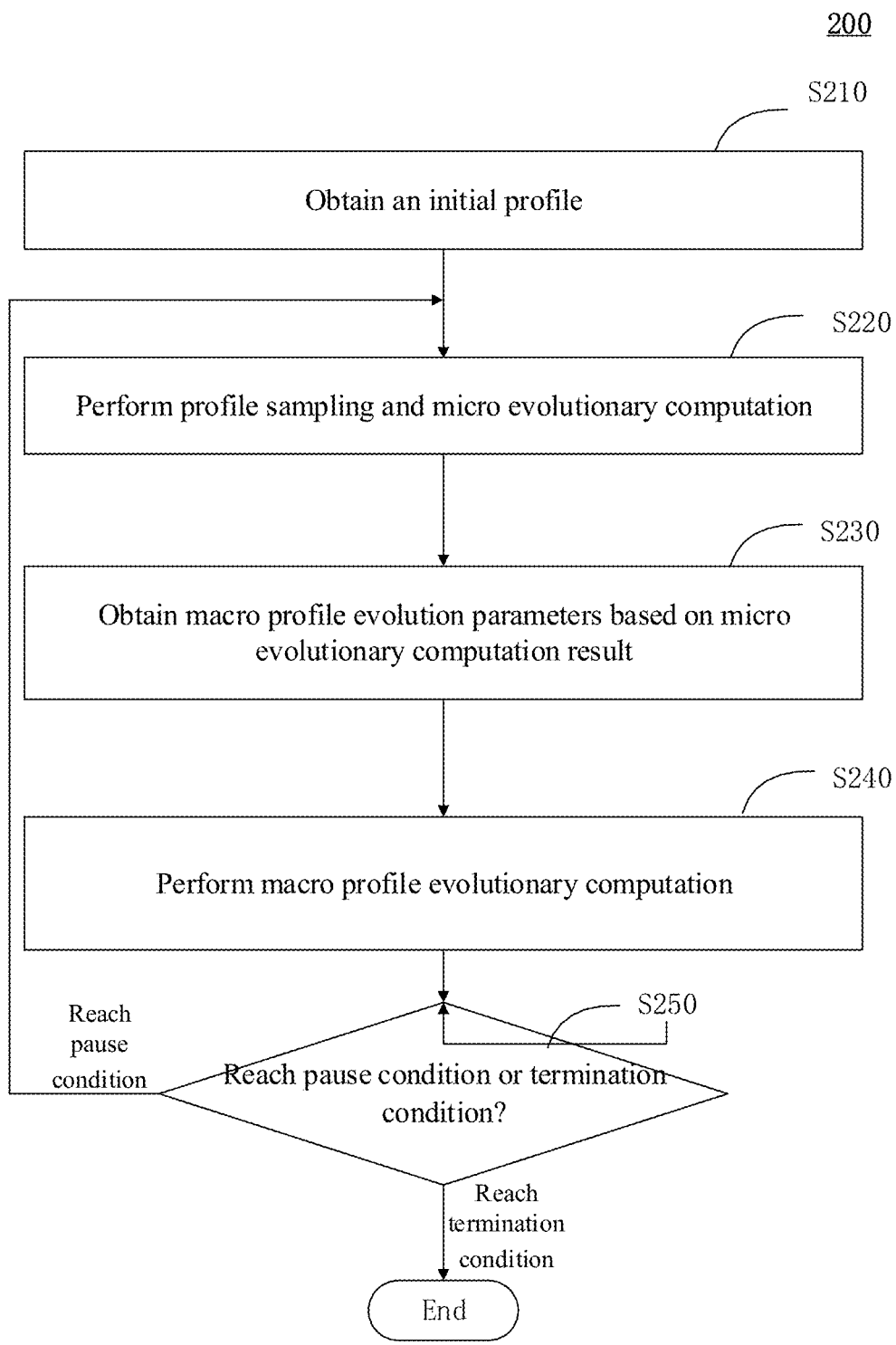
FIG. 2 shows an overall flow chart of a particle etching or depositing evolutionary simulation method 200 according to an embodiment of the present invention.

FIG. 2 shows an overall flow chart of a particle etching or depositing evolutionary simulation method 200 according to an embodiment of the present invention.

The particle etching or depositing evolutionary simulation method is implemented by a computer and is used for predicting the morphology of a material surface to be etched or deposited after etching or depositing is performed for given time.

As shown in the figure, in step S210, an initial profile is obtained.

The initial profile here refers to a material surface for etching or depositing. The initial profile can be an original surface of a material not subjected to any etching or depositing yet, and in this case, the initial surface can be a plane. Or, the initial profile may also be an evolution result obtained after simulating for a period of time by using other etching or depositing evolution method, and still may also be an evolution result similarly obtained after simulating for a period of time by using the etching or depositing evolution method according to the embodiment of the present invention, and in this case, the profile can be an approximately U-shaped surface. The embodiment of the present invention does not specifically limit the "initial profile". Likewise, the method and manner of obtaining corresponding initial macro evolution parameters are not limited here, for example, they can be manually designated, obtained by micro evolutionary computation in following step S230, obtained by computation with other algorithm, or the like.

In the case where the macro evolution method is the cellular automaton, the profile can be represented by a set of single-layer cells exposed outside for etching or depositing.

After the initial profile is obtained in step S210, it proceeds to step S220.

In step S220, a series of areas are sampled for the profile, a micro evolution process is performed on each of the series of areas by using a micro etching or depositing method to obtain a micro evolutionary computation result, wherein incident particles vs. substrate is modeled by using a micro etching or depositing method, so that particles are subjected to automatic dynamics evolution through a potential function or a set rule to obtain the change of the substrate under the action of incident ions or neutral particles, these changes being regarded as the depositing or etching result of these particles on the substrate.

Figure 3:
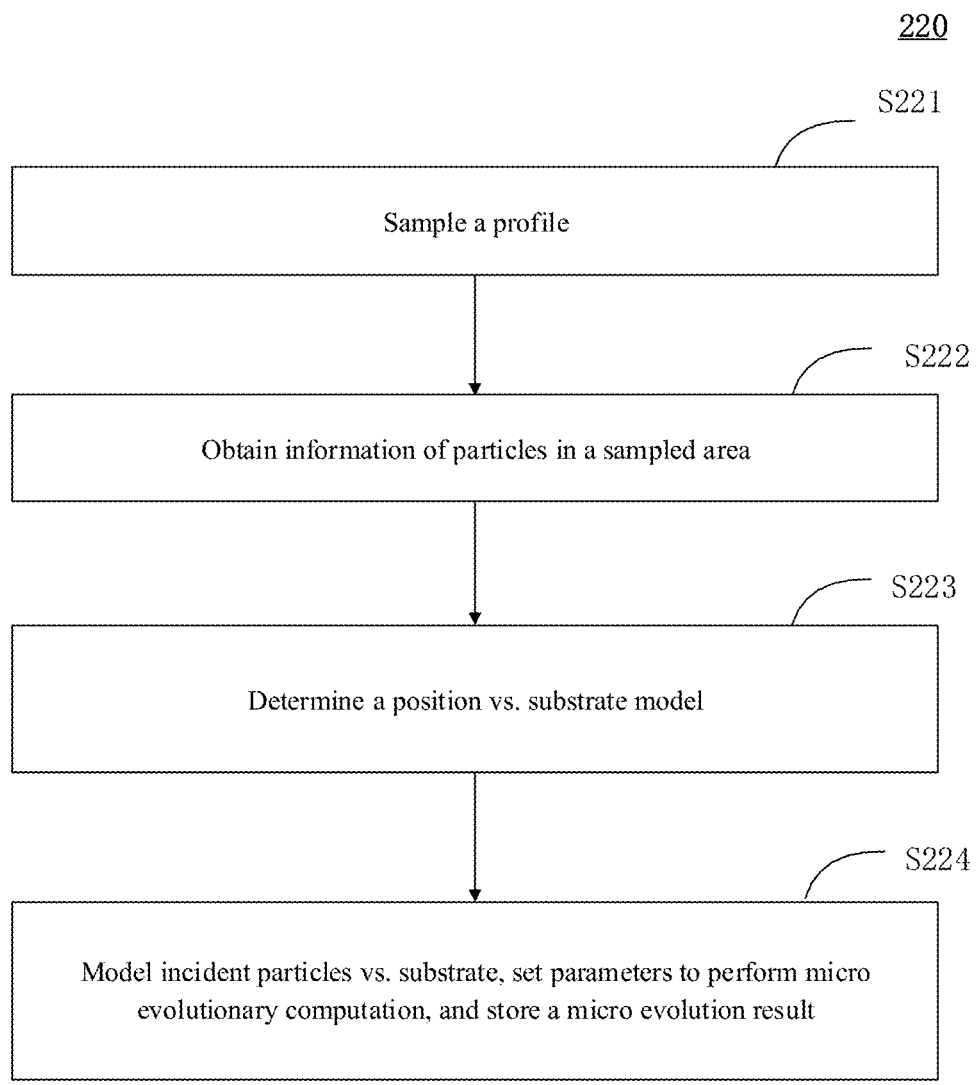
FIG. 3 shows a flow chart of a micro evolution method 220 according to an embodiment of the present invention.

An exemplary micro evolution method is described below with reference to FIG. 3. FIG. 3 shows a flow chart of a micro evolution method 220 according to an embodiment of the present invention, and the micro evolution method 220 can be applied to step S220.

In step S221, the profile is sampled.

It is desired in a sampling principle that a sampled small area (hereinafter referred to as a sampling point) can represent the profile feature of a certain surrounding area when considered from the view of etching or depositing, subsequently, the sampling point is subjected to micro evolution, and macro evolution parameters of a large area where the sampling point is located are estimated according to a micro evolution result.

In an example, simply, the profile can be uniformly sampled. However, preferably, the curvature of the profile can be estimated, and the types and distribution of incident particles can be analyzed, so that a neighboring area around the sampling point has substantially consistent situation of incident particles and substantially consistent curvature distribution.

In an example, in order to facilitate selection of micro sampling points, the whole profile can be divided into blocks, each of which is used as a minimum evolution unit of a micro evolution algorithm, for example, a molecular dynamics method. The size of the blocks can be determined according to factors such as the fineness of profile display of the computation result, computation speed, size of the substrate, incident quantity of space particles and the like. In the case where visual display of simulation needs to be performed and the visual display needs to be finer, a smaller block should be selected. In addition, generally, as molecular dynamics and other micro computation require a certain relation is met between the number of atoms of the substrate and the number of input particles, generally a certain amount of particles is correspondingly required according to different types of the input particles, so as to ensure sufficient interaction with a substrate material. Therefore, the division of the blocks or the size of the blocks needs to consider not only the fineness of profile display and computation speed, but also sufficient size of the substrate and incident quantity of space particles.

In the case where a macro evolution algorithm uses a cellular automaton, the whole material will be separated into cellular sets. If the size of a cell itself is suitable for micro evolution, the cell can be taken as the block above, and otherwise, a plurality of cells can be combined for micro evolution compunction.

In an example, in order to perform sampling, the profile can be divided into various areas. In each area, the situation of incident particles is substantially consistent, and the curvature of a macro area is substantially consistent, so as to facilitate selecting a representative part from the area for performing micro sampling and evolutionary computation. It is noted that each "area" here and the "block" above are not the same concept, the "area" here is a concept broader than "block" basically, the area can be composed of the blocks, for example, after area division, a block is selected from each area to serve as a micro computation area.

Figure 4A:
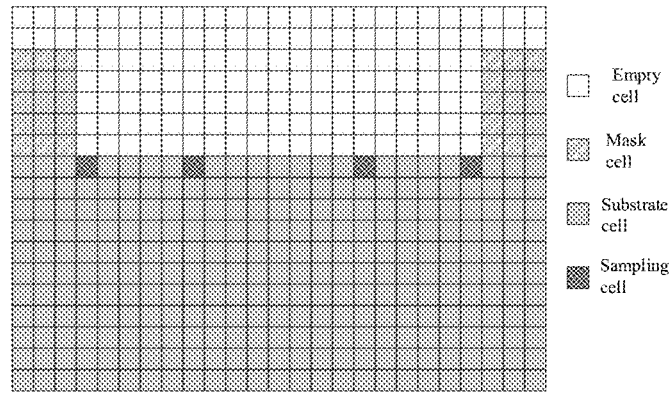
FIGS. 4A, 4B, 4C and 4D schematically show a schematic view of sampling point selection at the original time of two-dimensional etching process simulation, a schematic view of sampling point selection in the process of the two-dimensional etching process simulation, a schematic view of sampling point selection at the original time of three-dimensional etching process simulation, and a schematic view of sampling point selection in the process of the three-dimensional etching process simulation, respectively.
Figure 4B:
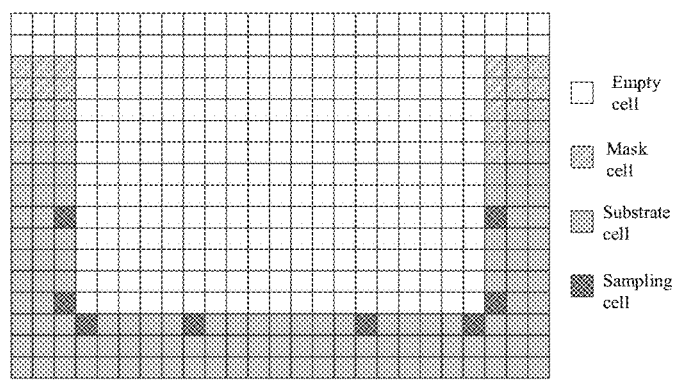
Figure 4C:
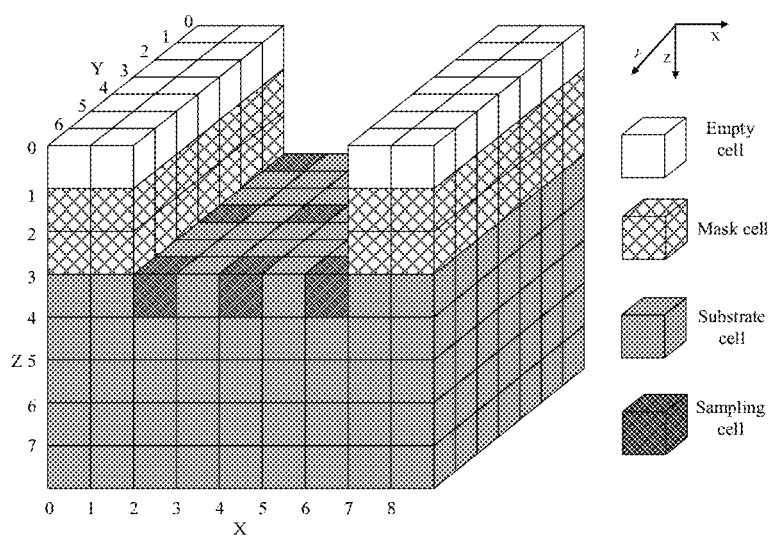
Figure 4D:
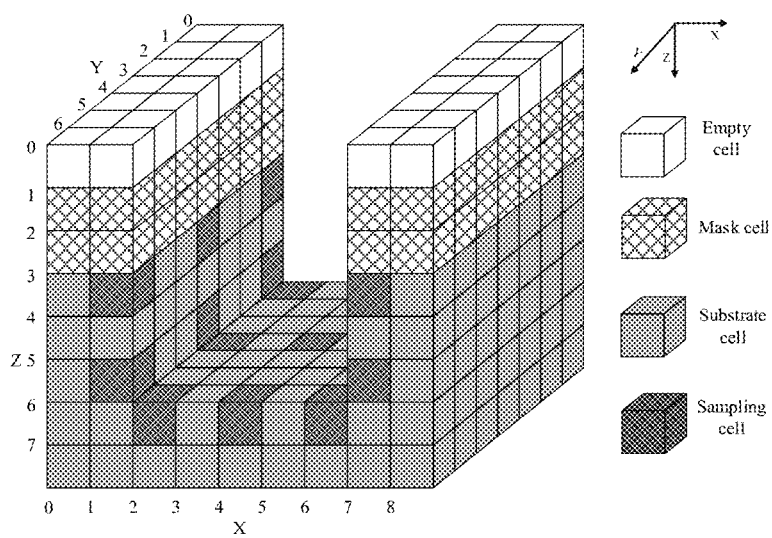
Figure 5A:
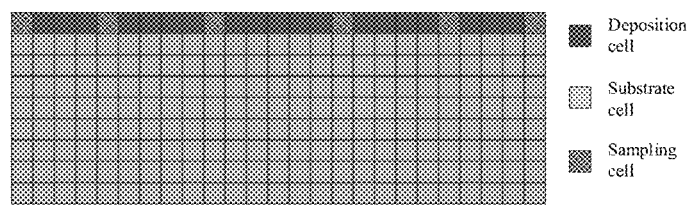
FIGS. 5A, 5B, 5C and 5D schematically show a schematic view of sampling point selection in two-dimensional planar depositing process simulation, a schematic view of sampling point selection in the process of the two-dimensional in-groove depositing process simulation, a schematic view of sampling point selection at the original time of three-dimensional planar depositing process simulation, and a schematic view of sampling point selection in the process of the three-dimensional in-groove depositing process simulation, respectively.
Figure 5B:
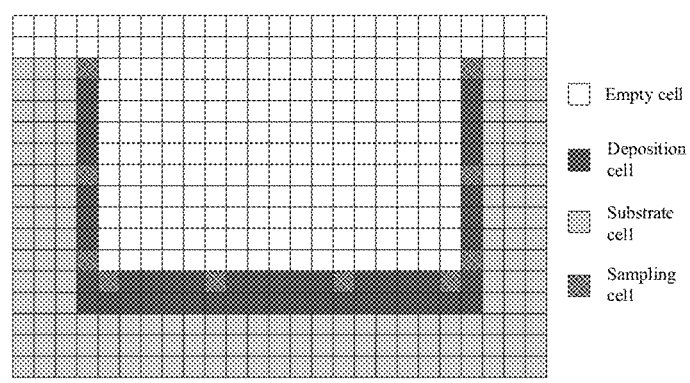
Figure 5C:
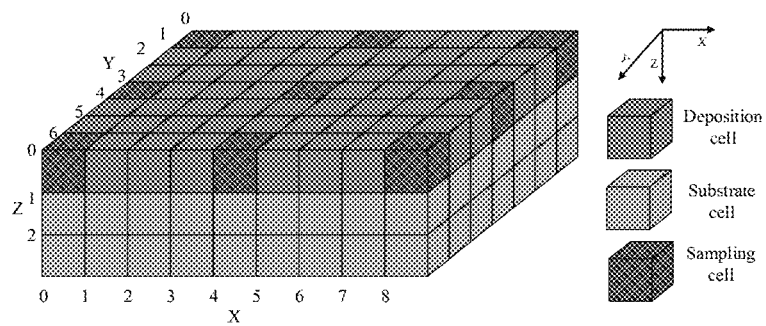
Figure 5D:
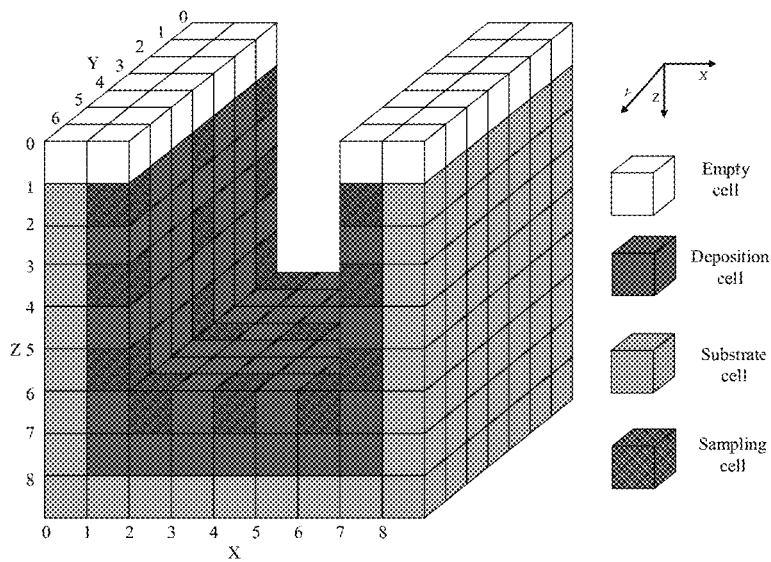

FIGS. 4A, 4B, 4B and 4D schematically show a schematic view of sampling point selection at the original time of two-dimensional etching process simulation, a schematic view of sampling point selection in the process of the two-dimensional etching process simulation, a schematic view of sampling point selection at the original time of three-dimensional etching process simulation, and a schematic view of sampling point selection in the process of the three-dimensional etching process simulation, respectively. It can be seen in FIGS. 4A, 4B, 4C and 4D, sampling points at the boundary or corners of a profile are denser.

FIGS. 5A, 5B, 5C and 5D schematically show a schematic view of sampling point selection in two-dimensional planar depositing process simulation, a schematic view of sampling point selection in the process of the two-dimensional in-groove depositing process simulation, a schematic view of sampling point selection at the original time of three-dimensional planar depositing process simulation, and a schematic view of sampling point selection in the process of the three-dimensional in-groove depositing process simulation, respectively. It can be seen in FIGS. 5A, 5B, 5C and 5D, sampling points at the boundary or corners of a profile are denser.

The above sampling method is only an example, and the person skilled in the art can design a sampling strategy as needed.

After sampling in step S221, it proceeds to step S222.

In step S222, information of particles of a sampled area is obtained.

The information of particles of the sampled area includes the type and number of particles within the sampled area, flux, incident angle of ions, ion energy and the like. In an example, information of particles (mainly including ions and neutral particles) entering a computation area is given, and assuming that particle distribution is uniform (if particle distribution is nonuniform, the particles are divided into different blocks, and in the case of a small scale, particles reaching the surface can be considered as uniform), information of space input particles can be converted into each micro computation area according to an area or volume proportional relation in a macro computation area.

In step S223, a position vs. substrate model of the sampled area is determined.

In an example, which position vs. substrate model is adopted is determined according to coordinate relations segmented by blocks in the macro area, that is, determining the substrate model at which position is sampled. This is because with proceeding of the macro evolution, evolution results of sampling points at different positions of a same profile are different (see FIGS. 6A, 6B and 6C). In this way, in next round of iteration, when evolutionary computation is performed on sampling points of a new profile, evolution needs to be continued on the basis of sampling points of the previous profile, thus, the evolution result of the nearest sampling point of a previous profile is selected as an initial substrate model of a sampling point of a new evolution profile through coordination relations, thus a more appropriate evolutionary simulation result can be obtained.

For example, position information of a sampled area is compared with coordinate information of a previously stored micro evolutionary computation result of the sampling points (for example, by calculating the distance between sampling points on two macro profiles), if the result is very approximate, the substrate of the previously stored micro evolutionary computation result of the sampling points can be taken as the initial condition of current evolution, thereby ensuring selection of the micro substrate is closest to the actual condition of a current surface.

In step S224, geometric space modeling is performed in a micro area by using the substrate model corresponding to the position and information of input particles, and simultaneously, parameters of the model, such as solved step size, potential function, or particle behavior probability and the like are set, then micro evolutionary computation is performed, and a micro evolution result is stored.

The termination condition of micro evolutionary computation can be set as required, for example, for the molecular dynamics method, it can end after stabilization of systematic evolution after finishing the input of particles to be input, that is reaching the number of particles to be input.

As mentioned above, for a profile, there are a plurality of sampling points representing areas around the sampling points. For the plurality of sampling points, micro evolutionary computation can be performed in parallel to shorten computation time, and obtain and store a micro evolution result.

FIGS. 6A, 6B and 6C schematically shows a micro molecular dynamics computation example of three sampling points on a profile.

Micro morphology of each of the sampling points is obtained by micro evolutionary computation (see FIGS. 6A, 6B and 6C), and can be represented by coordinates of particles.

The computation result of a micro computation area and the coordinate on a corresponding profile can be correspondingly stored, so as to conveniently select the substrate of the computation result of this time as the initial condition of evolution through coordinate relation comparison when next micro area computation is performed, thereby ensuring that the selection of the micro substrate is closest to the actual condition of the current surface.

Returning to FIG. 2, after step S220, it proceeds to step S230.

In step S230, macro profile evolution parameters are obtained based on the micro evolutionary computation result.

The micro evolutionary computation result can include or allows to obtain therefrom etching (or depositing) yield and etching (or depositing) rate and other information of a sampling point, and as the etching or depositing characteristic of the sampling point can represent a predetermined area around the sampling point, information obtained based on the sampling point can be applied to the predetermined area around the sampling point. Etching (or depositing) yield information and etching (or depositing) rate information are parameters of the macro profile evolution algorithm.

Moreover, optionally, the micro evolutionary computation result further includes information about a space product departing from the substrate, for example, which type of particle or how many particles leave the substrate to enter a space. Space distribution of particles and other conditions required by the macro evolution algorithm can be modified based on information about the space product departing from the substrate, for example, information of particles departing from the substrate in a micro area is converted into a neighboring area of a macro profile represented by the micro area according to area or volume proportional relation, so as to update the space distribution of particles in the macro profile area.

The above parameters required by the macro evolution algorithm are merely exemplary, but the present invention is not limited thereto. The required parameters may be different according to different adopted macro evolution algorithms, and correspondingly, the micro evolutionary computation results may also be correspondingly adjusted.

After step S230, it proceeds to step S240.

In step S240, macro profile evolutionary computation is performed based on the macro evolution parameters obtained in step S230.

In one example, during macro profile evolution, the macro evolution parameters remain unchanged, and a simple profile evolution manner is adopted to accelerate the speed of simulation computation.

FIG. 7 schematically shows the overall morphology of a material after a period of macro profile evolution.

In step S250, whether macro evolution reaches a pause condition or a termination condition is judged.

The pause condition here refers to a condition set for performing micro evolutionary computation so as to update macro evolution parameters. The pause condition can be at least one or a combination of the following items: elapse of a given macro evolution time interval, completion of computation of a certain number of particles in the simulation system, change of a particle input condition, change of surface parameters and the like, wherein the change of a particle input condition refers to, for example, change of a given particle flux, type of particles, ion energy and the like, and the change of surface parameters refers to, for example, great change of substrate conditions such as curvature of a surface near some area under the action of a great amount of ions with high energy.

The termination condition here refers to a condition that the whole particle etching or depositing evolution process terminates, and the termination condition can be completion of whole computation of input particles, elapse of entire evolution time and the like.

If the judgment result of step S250 is reaching the termination condition, the entire particle etching or depositing evolution process ends, and otherwise, if the pause condition set for updating the macro parameters is reached, the process is returned to step S220, the following processes are repeated: sampling on a profile obtained from the macro evolution result, performing micro evolution on a sampling point (S220), updating the macro evolution parameters are updated according to the micro evolution result (S230), and performing macro evolution (S240).

The examples above describe the particle etching or depositing evolutionary simulation method according to the embodiment of the present invention, micro evolutionary computation is performed by sampling a macro area in the etching and depositing simulation process, and parameters necessary for macro simulation computation are obtained in a dynamic environment, so that key parameters of the macro method obtained are more well-founded and more accurate.

By using the particle etching or depositing evolutionary simulation method according to the embodiment of the present invention, a micro evolution condition is determined by macro computation, meanwhile, a micro evolution result is transferred to a macro process to determine the macro evolution parameters (including change of distribution of space particles), so as to realize organic coupling of macro computation and micro computation.

The particle etching or depositing evolutionary simulation method according to the embodiment of the present invention combines the macro method and the micro method which are used for etching and depositing computation, thus at least partially solving the problem of trans-scale simulation. Therefore, the simulation result is more accurate and rapid, which is favorable for more comprehensively understanding the mechanism of the process and adjusting process parameters by a user.

The above particle etching or depositing evolutionary simulation method according to the embodiment of the present invention is not exclusive, and on the contrary, can be supplemented with operations or modified as required, for example, in order to conveniently demonstrate a macro profile evolution process and also a micro evolution scene to a user, the macro profile evolution process can be recorded within a certain time interval, meanwhile, the micro evolution process of a sampling point related to each of various profiles subjected to sampling and micro evolution operation is recorded, so as to form time evolution demonstration on a small scale, to allow records of macro and micro evolution processes to be obtained at the same time, and presented to the user as required by the user.

For example, for storage of the micro evolution scene, coordinates of points generated in a profile evolution process are stored at given time, and micro computation results of the profile corresponding to various sampling points are stored in a structured manner, for example, evolution of a micro area corresponding to the profile is associated in an index establishment or a special file designation manner, so as to form a file set for the simulation result, and be favorable for performing graphical display in or at the end of the simulation process.

In connection with a specific etching and processing simulation process, an application example of the etching or depositing evolutionary simulation method according to an embodiment of the present invention is described below. A silicon substrate material is etched by fluorocarbon gas, in this example, a cellular automaton method is adopted as the macro profile computation method, and a molecular dynamics method is adopted as the micro evolution method.

An example of a particle etching evolutionary simulation method 300 according to an embodiment of the present invention is described below in combination with FIG. 8.

In step S310, a simulation area is divided to obtain cells used in the cellular automaton method.

Specifically, for example, the simulation area is divided into lattices continuously and compactly arranged in a regular manner, each lattice is called a cell, which is a minimum unit for macro evolution, these cells include empty cells and non-empty cells with respective cell codes, the empty cell represents an area with no particle, and has a code represented as 0, the code of the non-empty cell represents the type of occupied substances in an area where the cell is located, including two types, i.e. a mask and a substrate, which are represented by codes 1 and 2 respectively, and the macro area cell division is completed.

After cell division in step S310, it proceeds to step S320.

In step S320, a surface cell set is sampled. A surface cell refers to a material cell bordering an empty cell, and the sampling method is, for example, uniform sampling along the surface.

After sampling in step S320, it proceeds to step S330.

In step S330, information of particles reaching the cells is counted.

For example, particles input to the surface of the macro computation area are generated in a model in a random selection or uniform distribution manner, information of particles reaching the cells is counted, and the information of particles includes type and energy of the particles, incident angle and the like. The specific method can include the following steps:

1) calculating a surface normal vector of the area where a sampling cell is located by, for example, using the following method: selecting coordinates of all cells within the range of a neighboring area having a radius of R (R=5 in this example) around the cell as a coordinate point set S, solving the normal vector of the set S by using a least square method, specifically, solving a linear normal vector in a two-dimensional case, and solving a planar normal vector in a three-dimensional case;

2) calculating an included angle between the surface normal vector of the area where the sampling cell is located and the movement direction vector of incident ions, the angle being the incident angle, and counting the type and energy of the particles.

After counting information of the particles reaching the cells in step S330, it proceeds to step S340.

In step S340, based on the substrate and the information of particles, a potential function is selected to construct a micro evolution model.

For example, a micro evolution model is constructed for evolution by taking a sampling cell as a substrate for micro evolution, taking information of particles reaching the cell as information of incident particles for micro evolution, and selecting a C-F-Si system SW potential function (See Stillinger F, Wener T A 1985, Phys. Rev. B 31 5262).

After constructing the micro evolution model in step S340, it proceeds to step S350.

In step S350, micro model evolutionary computation is performed. Specifically, a multi-process parallel computation manner is adopted to maintain a process pool with the volume of n (n=6 in this example), one micro evolution model obtained in step S340 is subjected to evolution in each process, and a series of evolution results are obtained.

After micro model evolutionary computation in step S350, it proceeds to step S360.

In step S360, a micro evolutionary computation result is stored, and the macro evolution parameters are updated. Specifically, the following steps are performed.

1) storing the micro evolutionary computation result, wherein in this example, the micro evolutionary computation result includes two parts, i.e., a micro evolution model result and an etching yield; storing the micro evolution model result with a coordinate name of a corresponding sampling cell, wherein the result can be taken as the initial condition of micro evolutionary computation of a next closest sampling cell in evolution, for example, if the coordinate of a sampling cell is (10,20,30), the micro evolution result is named 10_20_30.restart, the coordinate of the next closest sampling cell is (10,20,31), and the substrate model for the micro evolutionary computation of the closest sampling point is input as a 10_20_30.restart file;

2) transferring the etching yield obtained by micro evolutionary computation to a surface cell of the sampled area, and taking this parameter as a computation basis of performing material removal or growing in the neighboring area of the computation area to perform macro evolutionary computation, wherein parameters around the sampling cell are equivalent by data of the sampling cell, for example, if the etching yield at the sampling cell (10,20,30) is 0.26 obtained through the micro evolutionary computation, the amount of substance in the cell (10,20,30) and cells in its surrounding neighboring area is correspondingly reduced by 0.26, and if the depositing yield at a sampling cell (10,20,40) is 0.084 obtained through the micro evolutionary computation, the amount of substance in the cell (10,20,30) and cells in the normal vector direction of cells in its surrounding neighboring area is correspondingly increased by 0.084; and 3) converting space products (mainly including CF3, CF4 and other products in this example) departing from the substrate obtained by micro computation, into a macro computation area according to the area or volume proportion in accordance with products generated at each sampling point, to change particle distribution of the macro computation area.

After step S360, it proceeds to step S370.

In step S370, macro evolution is performed for a fixed period of time.

A fixed period of time (namely, the time interval of macro evolution) in this example is mainly controlled by interval of the number of particles, when a certain number of particles is calculated in a simulation system, if the action of all the particles on a surface is not finished, it returned to step S320 to perform surface sampling, micro evolution, macro parameter update, and macro evolution of a next round of iteration.

It needs to be illustrated that in the example, profile evolution results are stored at a regular time interval (preferably, according to interval of macro evolution) in the macro evolution process, and in the result of each profile, an index of micro sampling points corresponding to the profile is attached. Thus, the user can watch the macro evolution process, and if the user is interested in the micro evolution of some profile, he/she can click the profile to trigger micro evolution result demonstration related to the sampling points of the profile.

After the macro evolution is carried out for a certain period of time in step S370, it proceeds to step S380. In step S380, whether the action of all the particles on the surface is finished is judged, if yes, the whole evolution ends, and if not, it returns to step S320 to perform a next round of iteration.

The above etching or depositing evolutionary simulation method can be implemented with corresponding program modules, which constitute the etching or depositing evolutionary simulation device.

It needs to be illustrated that steps (or components) of the etching or depositing evolutionary simulation method (or device) can be implemented with software programs, for example, through a CPU in a general computer in combination with RAM, ROM and the like and software codes running in the CPU. The software programs can be stored on storage media such as a Flash memory, a floppy disk, a hard disk, an optical disc and the like, and is loaded on a random access memory (RAM) when running so as to be executed by the CPU. In addition, besides on the general computer, they can also be implemented through cooperation of an application-specific integrated circuit and software. The integrated circuit is implemented through, for example, at least one of an MPU (microprocessing unit), a DSP (digital signal processor), an FPGA (field-programmable gate array), an ASIC (application-specific integrated circuit) and the like. In addition, the steps (or components) of the etching or depositing evolutionary simulation method (or device) can be implemented with special hardware, for example, a special field-programmable gate array, a specific integrated circuit and the like. Moreover, the steps (or components) of the etching or depositing evolutionary simulation method (or device) can also be implemented through combination of software and hardware.

According to an embodiment of the present invention, provided is a non-transient computer readable medium, storing an instruction set thereon which, when being executed by a processor, guides the processor to perform steps (components) of the etching or depositing evolutionary simulation method (or device), including: step 1, obtaining an initial profile; step 2, sampling a series of areas for the profile, performing an evolution process on each of the series of areas by using a micro etching or depositing method to obtain a micro evolutionary computation result, wherein incident particles vs. substrate is modeled by using a micro etching or depositing method, so that the particles are subjected to automatic dynamics evolution through a potential function or a set rule to obtain the change of the substrate under the action of incident ions or neutral particles, these changes being regarded as the depositing or etching result of these particles on the substrate; step 3, obtaining macro profile evolution parameters based on the micro evolutionary computation result; step 4, performing macro profile evolutionary computation, including: performing profile evolutionary computation based on the macro evolution parameters by using a macro profile evolution method until a predetermined pause condition or evolution termination condition is met, obtaining a new profile and storing the profile evolution result, wherein in the macro profile evolution method, the overall morphology etched and deposited under the action of a large number of particles is obtained through evolution by giving the etching yield, the depositing yield, the etching rate or depositing rate of some material under the action of a certain particle flow; and step 5, judging whether the termination condition is met, if yes, terminating evolution, and if not, repeating the steps 2-4.

The structure and number of steps (or components) of the etching or depositing evolutionary simulation method (or device) do not constitute limitation to the scope of the present invention. According to an embodiment of the present invention, the components and/or steps can be combined into an independent component and/or step to perform and implement corresponding function and operation, or are further divided into smaller units to achieve their respective function and operation.

Embodiments of the present invention are already described above. The illustration is exemplary instead of being exhaustive, and is not limited to the disclosed embodiments. Various modifications and variations are obvious to a person of ordinary skill in the art without departing from the scope and spirit of the illustrated embodiments. Therefore, the protection scope of the present invention should be based on the protection scope of claims.

The invention claimed is:

1. A particle etching or depositing evolutionary simulation method applied to a material surface and implemented by a computer, which is used for predicting a morphology of a material surface to be etched or deposited after etching or depositing simulation is performed, wherein the particle etching or depositing evolutionary simulation method comprises:

step 1, obtaining an initial profile;
step 2, sampling a series of areas for the profile, performing an evolution process on each of the series of areas by using a micro etching or depositing method to obtain a micro evolutionary computation result, wherein incident particles vs. substrate is modeled by using the micro etching or depositing method, so that the particles are subjected to automatic dynamics evolution through a potential function or a set rule to obtain change of a substrate under action of incident ions or neutral particles, the change being regarded as the depositing or etching result of these particles on the substrate, wherein the sampling a series of areas for the profile in step 2 comprises: dividing the profile into areas, wherein in each area, situation of incident particles is consistent, and curvature of a macro area is consistent, so as to facilitate selecting a representative part from the area for performing micro sampling and evolutionary computation; selecting a subarea from each divided part to perform evolution with the micro etching or depositing method, wherein the micro evolutionary computation result of the subarea is used for calculating macro profile evolution parameters for a corresponding part in step 3;

step 3, obtaining macro profile evolution parameters of each sampled area based on the micro evolutionary computation result of corresponding sampled area;

step 4, performing macro profile evolutionary computation, comprising: performing profile evolutionary computation based on the macro evolution parameters by using a macro profile evolution method until a predetermined pause condition or evolution termination condition is met, obtaining a new profile and storing the profile evolution result, wherein in the macro profile evolution method, an overall morphology etched and deposited under action of an amount of particles typical of particle etching or depositing simulations is obtained through evolution by giving an etching yield, a depositing yield, an etching rate or depositing rate of a certain material under action of a certain particle flow; and step 5, judging whether the termination condition is met, if yes, terminating evolution, and if not, repeating the steps 2-4.

2. The particle etching or depositing evolutionary simulation method according to claim 1, further comprising: dividing a simulating area into blocks before step 2, each block being a minimum unit for micro evolution, wherein the size of the blocks is determined according to the fineness of profile display of the computation result, computation speed, size of the substrate, and incident quantity of space particles.

3. The particle etching or depositing evolutionary simulation method according to claim 2, wherein in the case where the macro evolution method is a cellular automaton, if the size of a cell is suitable for micro evolution, the cell is used as the block for micro evolution; and if the size of a cell is not suitable for micro evolution, a combination of a plurality of cells is used as the block for micro evolution.

4. The particle etching or depositing evolutionary simulation method according to claim 1, wherein modeling incident particles vs. substrate by using a micro etching or depositing method comprises:

matching the size of the substrate with the number of incident particles, so as to sufficiently express an etching and depositing result obtained by combined action of the incident particles and the substrate.

5. The particle etching or depositing evolutionary simulation method according to claim 1, wherein performing an evolution process on each of the series of areas by using a micro etching or depositing method in step 2 comprises:

performing an evolution process on a plurality of area in parallel.

6. The particle etching or depositing evolutionary simulation method according to claim 1, wherein the macro profile evolution parameters comprise an etching yield or etching rate, and further comprise a type and distribution of incident particles.

7. The particle etching or depositing evolutionary simulation method according to claim 6, wherein the micro evolutionary computation result of step 2 comprises information of particles departing from the substrate to enter a space, and in step 3, the type and distribution of the incident particles are updated based on the information of the particles departing from the substrate to enter the space.

8. The particle etching or depositing evolutionary simulation method according to claim 1, wherein the particle etching or depositing evolutionary simulation method allows to support two-dimensional profile simulation evolution and also support three-dimensional profile simulation evolution of etching and depositing by setting the sampled area of step 2.

9. The particle etching or depositing evolutionary simulation method according to claim 1, wherein the predetermined pause condition in step 4 is at least one or a combination of following items: elapse of a given macro evolution time interval, completion of computation of a certain number of particles in the simulation system, change of a particle input condition, and change of surface parameters.

10. The particle etching or depositing evolutionary simulation method according to claim 1, further comprising: within a certain time interval, meanwhile, recording the macro profile evolution process recording the micro evolution process of a sampling point related to each of various profiles subjected to sampling and micro evolution operation, so as to form time evolution demonstration on a small scale, to allow records of macro and micro evolution processes to be obtained at the same time, and presented to a user as required by the user.

11. The particle etching or depositing evolutionary simulation method according to claim 1, wherein in the case surface of the profile is divided into various parts, the parts with larger curvature change and/or more complex particle conditions have a larger sampling density.

12. The particle etching or depositing evolutionary simulation method according to claim 1, further comprising:
in step 2, associatively storing the micro evolutionary computation result of a specific computation area and coordinate on a corresponding profile; and
in step 2 of the next cycle, when micro evolutionary computation of an area is performed, coordinates of the area at this time are compared with coordinates of areas stored in a immediately previous cycle, and substrate of the computation result of a corresponding area in the immediately previous cycle is taken as initial condition of evolution of the area of the next cycle, thereby ensuring selection of a micro substrate is closest to actual condition of a current surface.

13. The particle etching or depositing evolutionary simulation method according to claim 1, wherein step 2 further comprises based on information of particles entering the given computation area for macro profile evolutionary computation, converting information of space input particles into each micro computation area according to an area or volume proportional relation.

14. The particle etching or depositing evolutionary simulation method according to claim 1, wherein the macro profile evolution method is one of a cellular automaton, a string algorithm and a level set.

15. The particle etching or depositing evolutionary simulation method according to claim 1, wherein the micro etching or depositing method is a molecular dynamics or monte-carlo method.

16. A non-transient computer readable medium, storing an instruction set thereon which, when being executed by a processor, guides the processor to perform an etching or depositing evolutionary simulation function, wherein the function comprises:
step 1, obtaining an initial profile;
step 2, sampling a series of areas for the profile, performing an evolution process on each of the series of areas by using a micro etching or depositing method to obtain a micro evolutionary computation result, wherein incident particles vs. substrate is modeled by using the micro etching or depositing method, so that the particles are subjected to automatic dynamics evolution through a potential function or a set rule to obtain the change of the substrate under action of incident ions or neutral particles, the change being regarded as the depositing or etching result of these particles on the substrate, wherein the sampling a series of areas for the profile in step 2 comprises:
dividing the profile into areas, wherein in each area, situation of incident particles is consistent, and curvature of a macro area is consistent, so as to facilitate selecting a representative part from the area for performing micro sampling and evolutionary computation;
selecting a subarea from each divided part to perform evolution with the micro etching or depositing method, wherein the micro evolutionary computation result of the subarea is used for calculating macro profile evolution parameters for a corresponding part in step 3;
step 3, obtaining macro profile evolution parameters of each sampled area based on the micro evolutionary computation result of corresponding sampled area;
step 4, performing macro profile evolutionary computation, comprising: performing profile evolutionary computation based on the macro evolution parameters by using a macro profile evolution method until a predetermined pause condition or evolution termination condition is met, obtaining a new profile and storing the profile evolution result, wherein in the macro profile evolution method, an overall morphology etched and deposited under the action of an amount of particles typical of particle etching or depositing simulations is obtained through evolution by giving an etching yield, a depositing yield, an etching rate or depositing rate of a certain material under action of a certain particle flow; and
step 5, judging whether the termination condition is met, if yes, terminating evolution, and if not, repeating the steps 2-4.

17. A particle etching or depositing evolutionary simulation device applied to a material surface, which is used for predicting a morphology of a material surface to be etched or deposited after etching or depositing simulation is performed, the particle etching or depositing evolutionary simulation device comprising:
a CPU coupled to a memory upon which a computer executable instruction set is stored on the memory and is executed by the CPU;
an initial profile obtaining component, executed by the CPU, configured to obtain an initial profile;
a profile sampling and micro evolution component, executed by the CPU, configured to sample a series of areas for the profile, and perform an evolution process on each of the series of areas by using the micro etching or depositing method to obtain a micro evolutionary computation result, wherein incident particles vs. substrate is modeled by using a micro etching or depositing method, so that the particles are subjected to automatic dynamics evolution through a potential function or a set rule to obtain change of a substrate under action of incident ions or neutral particles, the change being regarded as the depositing or etching result of these particles on the substrate, wherein the sampling a series of areas for the profile comprises: dividing the profile into areas, wherein in each area, situation of incident particles is consistent, and curvature of a macro area is consistent, so as to facilitate selecting a representative part from the area for performing micro sampling and evolutionary computation; selecting a subarea from each divided part to perform evolution with the micro etching or depositing method, wherein the micro evolutionary computation result of the subarea is used for calculating macro profile evolution parameters for a corresponding part;

a macro profile evolution parameter obtaining component, executed by the CPU, configured to obtain macro evolution parameters of each sampled area based on the micro evolutionary computation result of corresponding sampled area;

a macro profile evolution component, executed by the CPU, configured to perform macro profile evolutionary computation, comprising: performing profile evolutionary computation based on the macro evolution parameters by using a macro profile evolution method until a predetermined pause condition or evolution termination condition is met, obtaining a new profile and storing the profile evolution result, wherein in the macro profile evolution method, an overall morphology etched and deposited under action of an amount of particles typical of particle etching or depositing simulations is obtained through evolution by giving etching yield, depositing yield, etching rate or depositing rate of a certain material under action of a certain particle flow; and an iteration control component, executed by the CPU, configured to judge whether the termination condition is met, if yes, terminate evolution, and if not, enable the profile sampling and micro evolution component, the macro profile evolution parameter obtaining component and the macro profile evolution component to repeat operations.

* * * * *